(12) United States Patent
Schrempf

(10) Patent No.: US 6,412,799 B1
(45) Date of Patent: Jul. 2, 2002

(54) ONE-PIECE RUNNING BOARD AND MOUNTING ASSEMBLY

(75) Inventor: Rudolph Allan Schrempf, Brampton (CA)

(73) Assignee: Decoma International Inc., Concord (CA)

( * ) Notice: Subject to any disclaimer, the term of this patent is extended or adjusted under 35 U.S.C. 154(b) by 0 days.

(21) Appl. No.: 09/581,433

(22) PCT Filed: Oct. 13, 1999

(86) PCT No.: PCT/CA99/00963

§ 371 (c)(1),
(2), (4) Date: Jun. 13, 2000

(87) PCT Pub. No.: WO00/21792

PCT Pub. Date: Apr. 20, 2000

Related U.S. Application Data

(60) Provisional application No. 60/104,228, filed on Oct. 14, 1998.

(51) Int. Cl.$^7$ ................................................. B60R 3/00
(52) U.S. Cl. ........................................ 280/163; 296/151
(58) Field of Search ........................... 280/163, 164.1, 280/166, 169; 296/151; 182/90, 91, 92

(56) References Cited

U.S. PATENT DOCUMENTS

| | | | |
|---|---|---|---|
| 890,963 A | * | 6/1908 | Coffin .......................... 280/163 |
| 2,537,707 A | * | 1/1951 | Russ et al. ................... 280/163 |
| 4,017,093 A | * | 4/1977 | Stecker, Sr. ................. 280/163 |
| 4,311,320 A | | 1/1982 | Waters |
| 4,456,275 A | * | 6/1984 | Snyder et al. ............... 280/163 |
| 4,557,494 A | | 12/1985 | Elwell |
| 4,934,721 A | * | 6/1990 | Flores ......................... 280/169 |
| D320,592 S | * | 10/1991 | Stratka |
| D330,536 S | * | 10/1992 | Holloway et al. |
| 5,193,829 A | | 3/1993 | Holloway et al. |
| D340,904 S | * | 11/1993 | Bevier |
| 5,286,049 A | | 2/1994 | Khan |
| 5,382,035 A | | 1/1995 | Waddington et al. |
| 5,511,750 A | | 4/1996 | Evenson |
| 5,713,589 A | | 2/1998 | Delgado et al. |
| 5,823,553 A | * | 10/1998 | Thompson ................ 280/164.1 |
| 6,050,579 A | * | 4/2000 | Selland et al. ............. 280/163 |
| 6,173,979 B1 | * | 1/2001 | Bernard ..................... 280/163 |

FOREIGN PATENT DOCUMENTS

| | | | |
|---|---|---|---|
| DE | 3248346 | * | 6/1984 |
| WO | 91/05678 | * | 5/1991 |

OTHER PUBLICATIONS

Printour from Internet Web Site www.vanandtruck.com, Mar. 2001.*

* cited by examiner

Primary Examiner—Brian L. Johnson
Assistant Examiner—Bryan Fischmann
(74) Attorney, Agent, or Firm—Clark Hill PLC

(57) ABSTRACT

An integrally formed running board including a plurality of mount projections (24) extending laterally from an inner edge (22) with a pair of parallel side walls (54) extending transversely to the longitudinal axis, a short wall (56) having ends closer together than the distan between the side walls (54) and a pair of converging walls (58) joining the side walls (54) at joints (60) and converging from the side walls (54) to the ends of the short wall (56). A projection-reinforcing rib (52) is disposed centrally between and parallel to the side walls (54) of each of the mount projections (24). A base rib (62) extends between the joints (60) of each pair of the side walls (54) with the associated pair of the converging walls (58). A pair of continuing ribs (64) extend from the side walls (54) aligned therewith to an outer wall (23). A pair of crossing ribs (66) are disposed in an X configuration with each crossing rib (66) extending diagonally between each pair of the continuing ribs (64) and intersecting at an apex (68) so that each projection-reinforcing rib (52) extends to and joins the adjacent pair of the crossing ribs (66) at the apex (68) thereof.

23 Claims, 5 Drawing Sheets

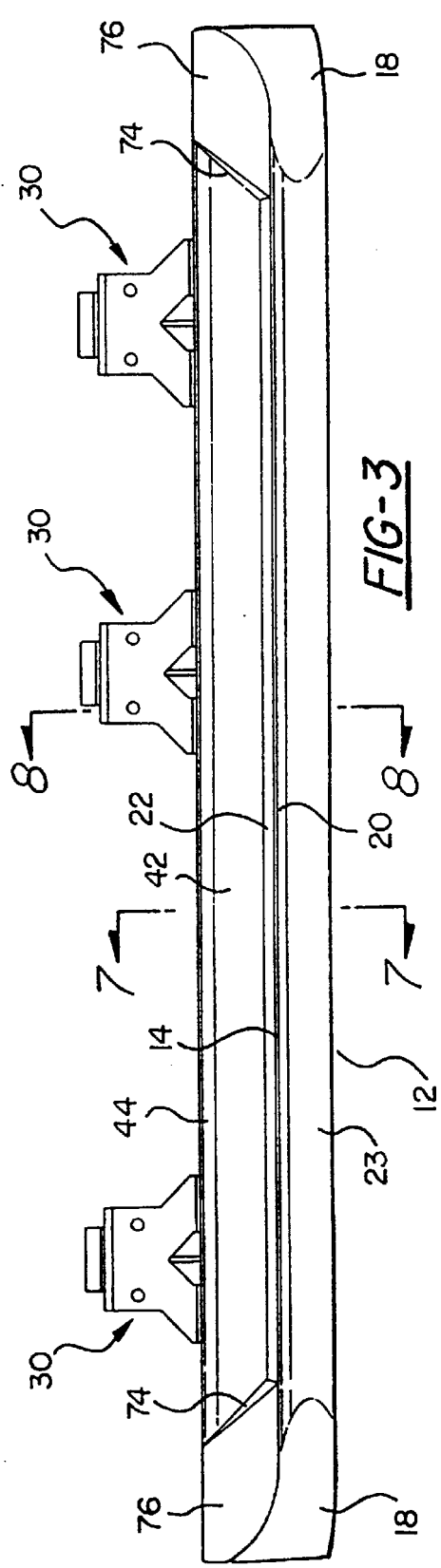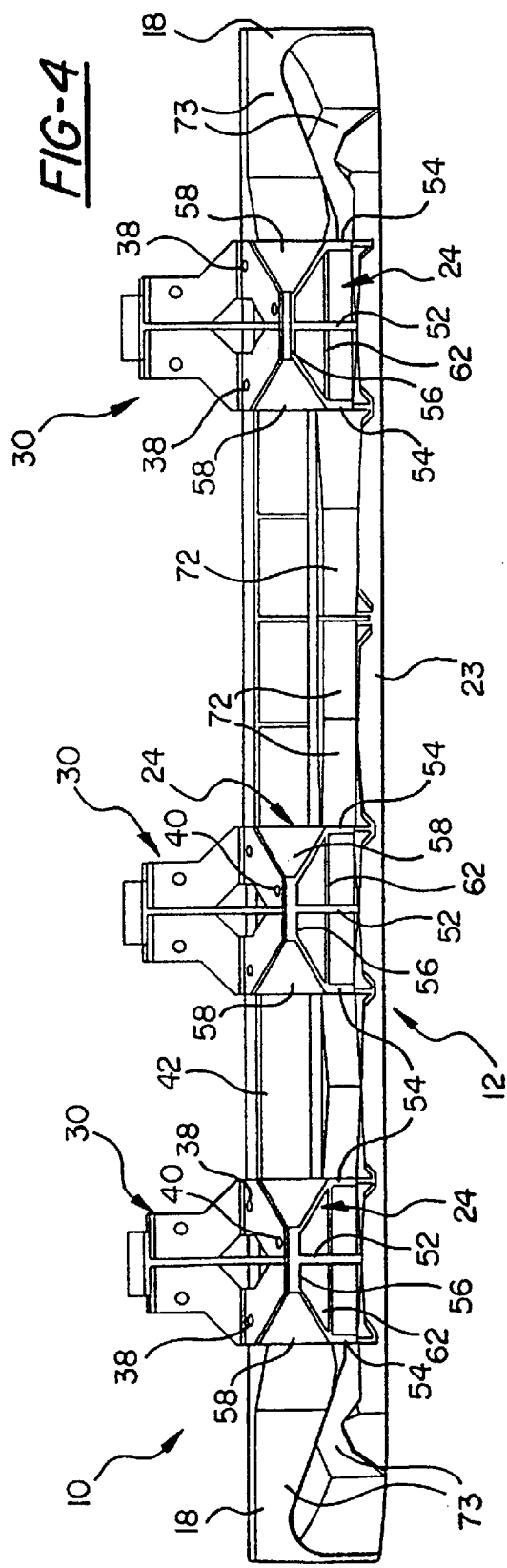

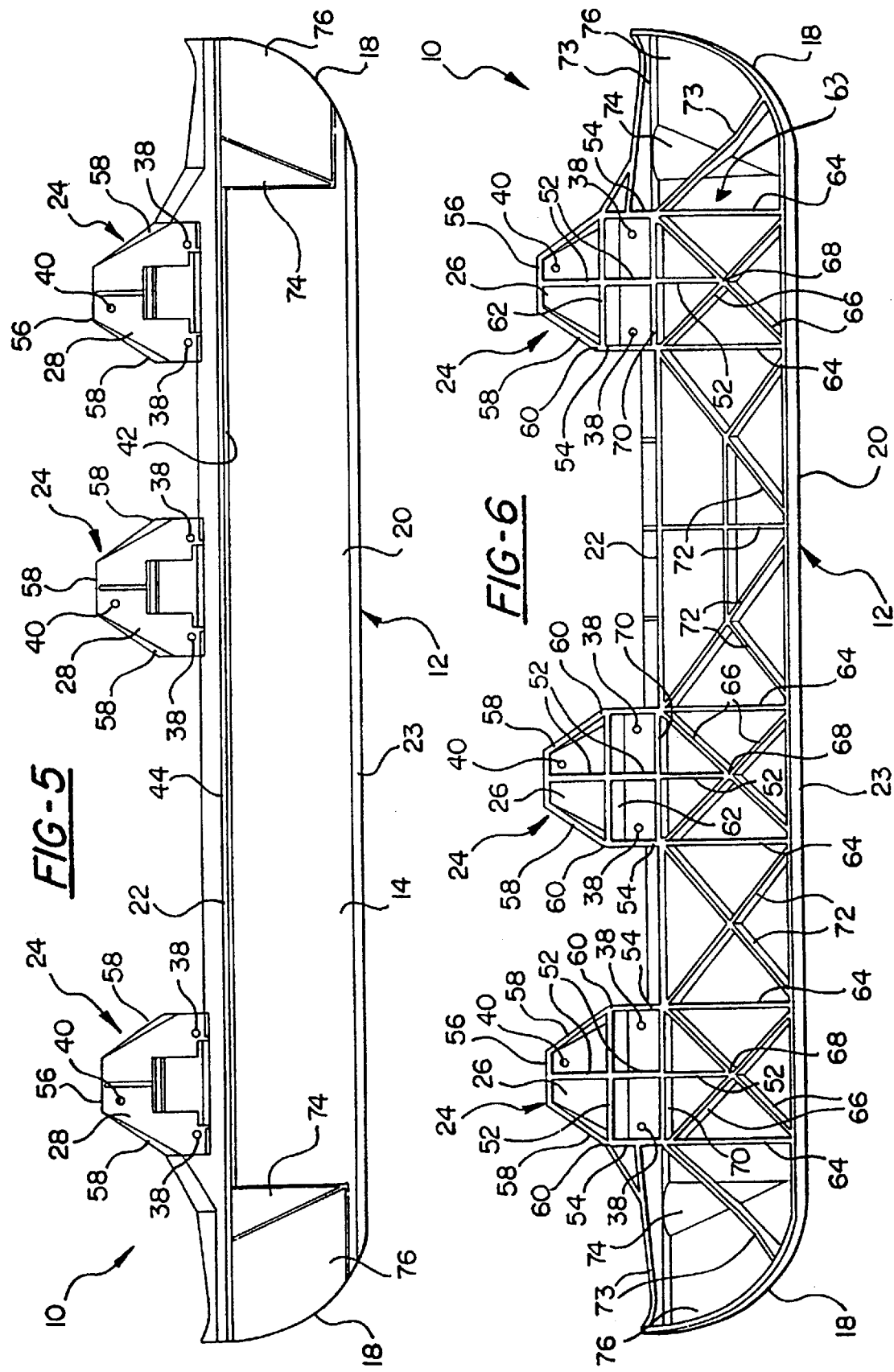

ONE-PIECE RUNNING BOARD AND MOUNTING ASSEMBLY

This application claims the benfit of provisional application No. 60/104,228, filed Oct. 14, 1998.

FIELD OF THE INVENTION

The subject invention relates to a running board of the type attached to the side of an automotive vehicle, such as a pick-up truck, for carrying the weight of a person entering the vehicle as the person steps upon the running board.

DESCRIPTION OF THE PRIOR ART

Numerous running board assemblies are known to allow the convenient access to light trucks and vans. Such running board assemblies include an elongated stepping platform having an upper surface and a lower surface extending between opposite ends along a longitudinal axis and laterally between outer and inner edges. Frequently, a plurality of mount projections are integral with and extend laterally from the inner edge of the platform and presenting a bottom surface and a mounting surface for supporting the platform on a vehicle. Various ones of such assemblies are disclosed in U.S. Pat. Nos 4,311,320 to Waters, 4,557,494 to Elwell, 5,193,829 to Holloway et al., 5,286,049 to Khan, 5,511,750 to Evenson, 5,713,589 to Delgado et al. and 5,382,035 to Waddington et al. Since the platform of the running board is cantilevered outwardly from the vehicle, a moment arm is established on the platform to create high stresses at the point about which the cantilevered platform is urged to rotate by loads thereon. It is, therefore, difficult to provide a structure wherein the running board and the mounting projections can be made of an integral or one piece of organic polymeric material with the projections having the requisite strength for resisting the moments on the platform.

There is a continuous need to provide an improved running board assembly which is easily installed, light weight and economically manufactured yet retain the requisite strength for supporting vehicle passengers.

SUMMARY OF THE INVENTION

The running board of the subject invention provides an improved running board assembly which is easily installed, light weight and economically manufactured and retains the requisite strength for supporting vehicle passengers when stepping on the board.

The running board assembly of the subject invention is adapted for attachment to the side of a vehicle and comprises an elongated stepping platform having an upper surface and a lower surface extending between opposite ends along a longitudinal axis and laterally between outer and inner edges. A plurality of mount projections are integral with and extend laterally from the inner edge of the platform and present a bottom surface and a mounting surface for supporting the platform on a vehicle. The assembly is characterized by a projection-reinforcing rib integral with and extending from the bottom of each of the mount projections.

Accordingly, the subject invention provides a running board platform with integral mount projections having the requisite strength to resist moments on the cantilevered platform as the platform carries the weight of vehicle passengers.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a front view of the preferred embodiment;

FIG. 4 is a rear view of the preferred embodiment;

FIG. 5 is a top view of the preferred embodiment;

FIG. 6 is a bottom view of the preferred embodiment;

DETAILED DESCRIPTION OF THE PREFERRED EMBODIMENT

Figure 1:
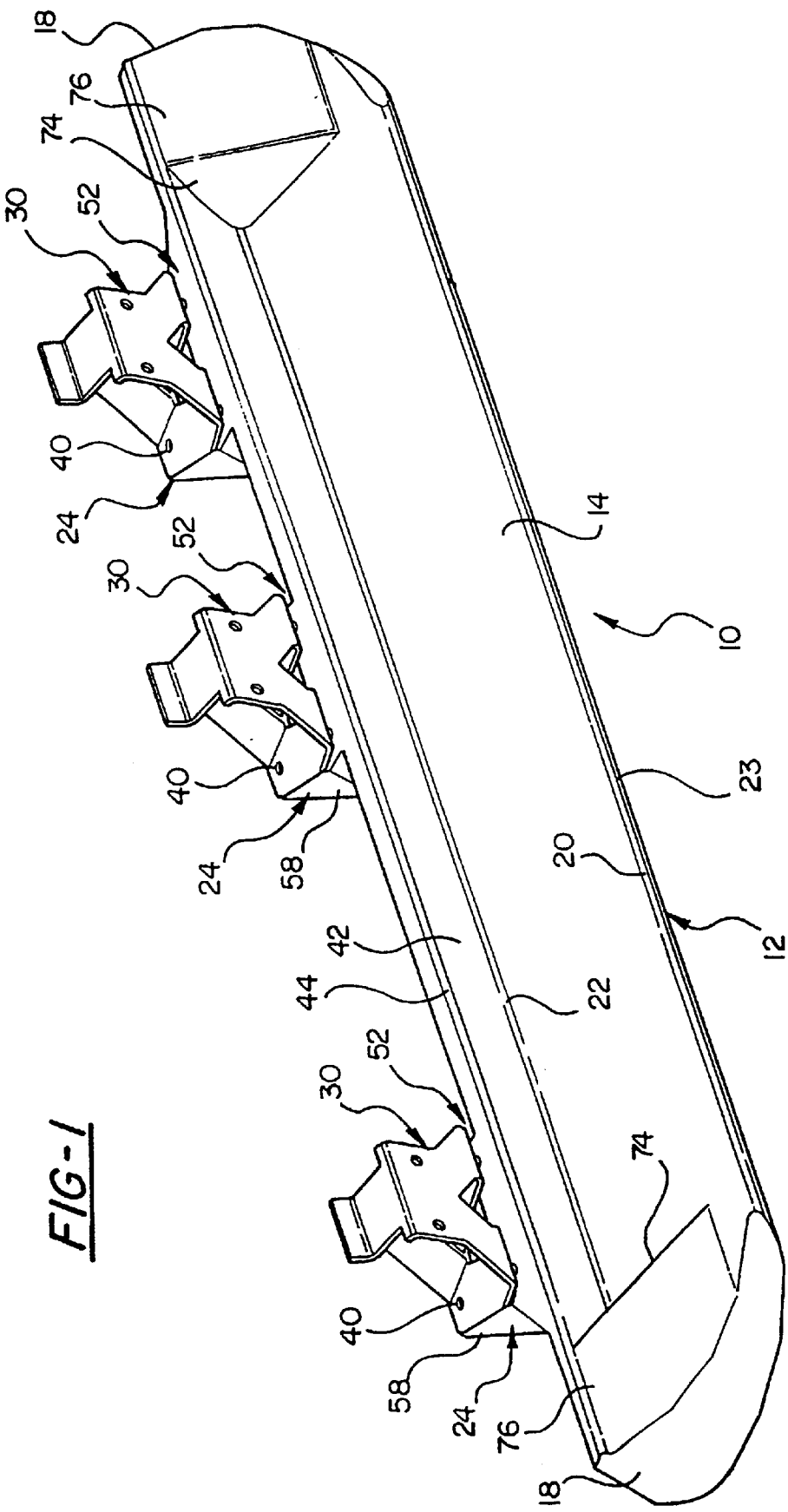
FIG. 1 is a perspective view of the top of a preferred embodiment.
Figure 2:
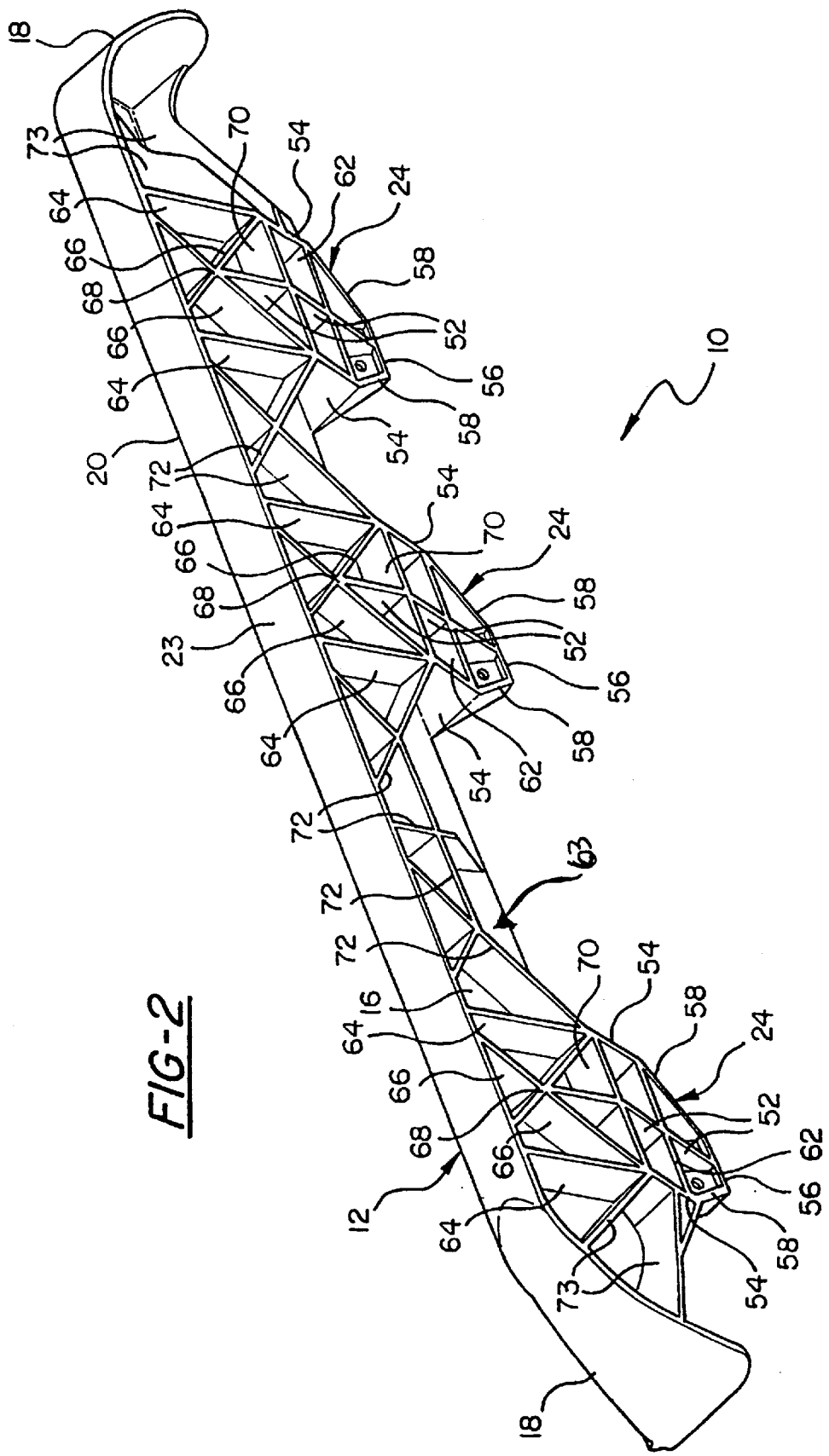
FIG. 2 is a perspective view of the bottom of the preferred embodiment.

Referring to the Figures, wherein like numerals indicate like or corresponding parts throughout the several views, a running board assembly for attachment to a side of a vehicle is generally shown at 10.

The assembly 10 comprises an elongated stepping platform, generally indicated at 12, having an upper surface 14 and a lower surface 16 extending between opposite ends 18 along a longitudinal axis and laterally between an outer edge 20 and an inner edge 22. An outer wall 23 extends downwardly below the lower surface 16 of the platform 12 along the outer edge 20.

Figure 7:
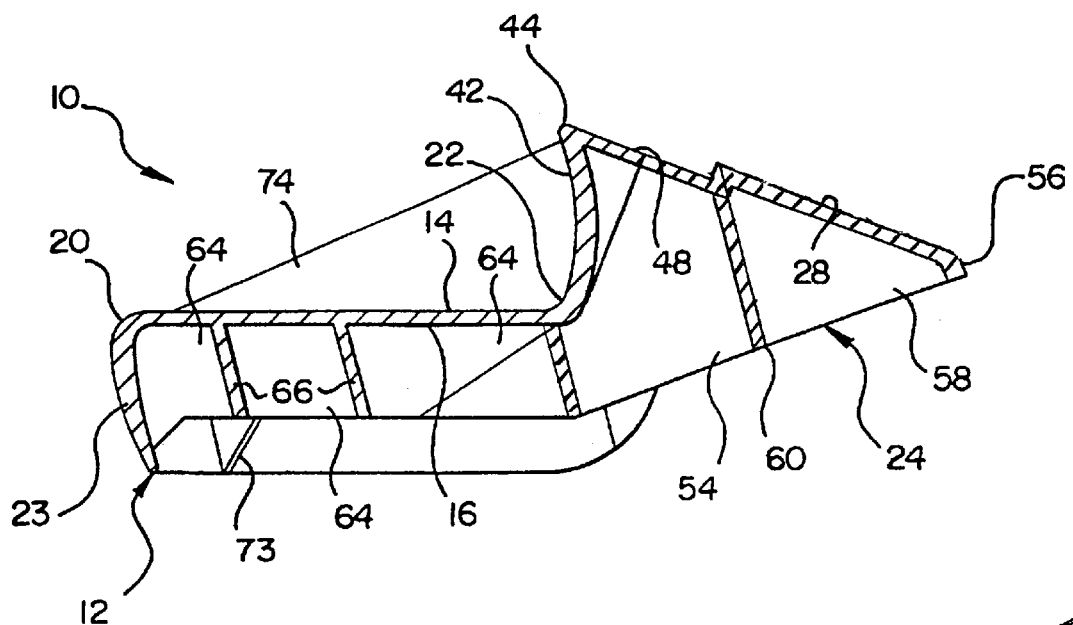
FIG. 7 is a cross sectional view taken along line 7—7 of FIG. 3.
Figure 8:
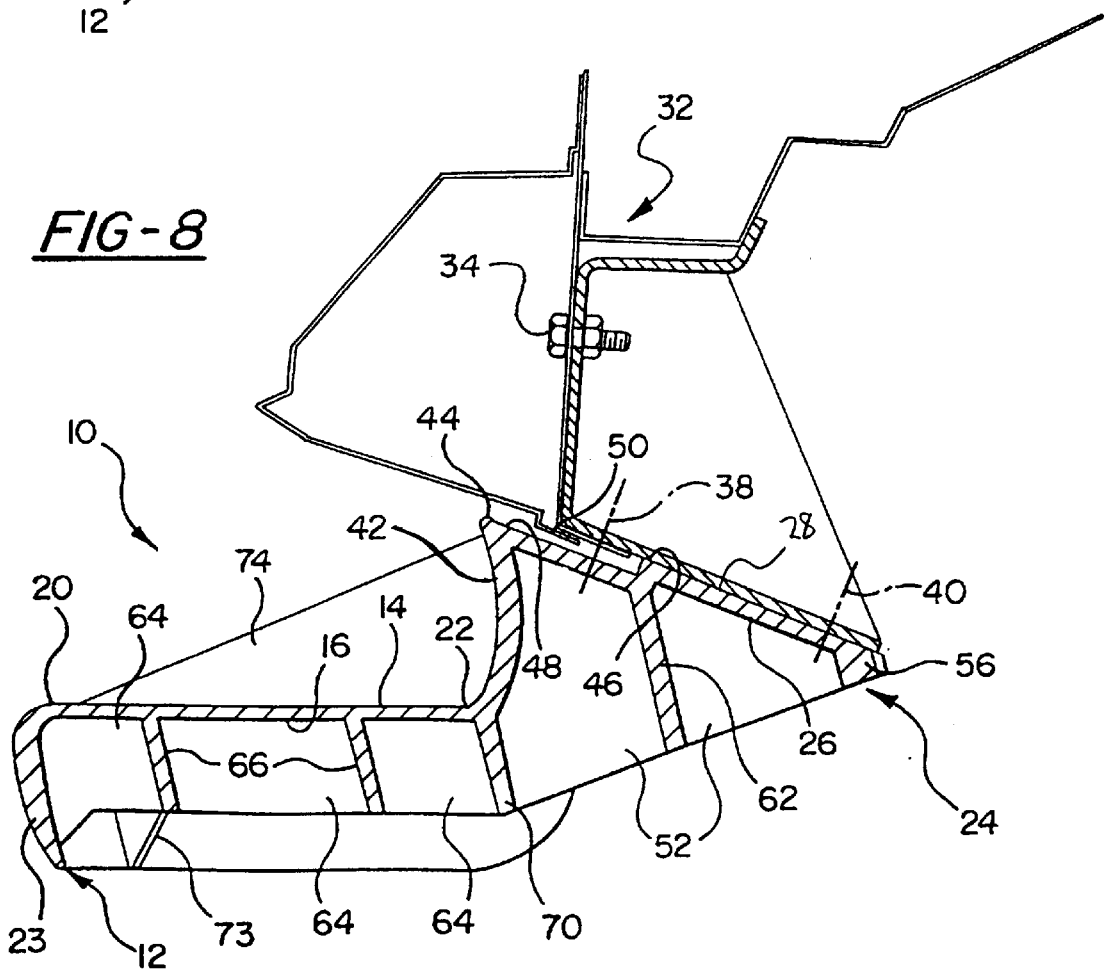
FIG. 8 is a cross sectional view taken along line 8—8 of FIG. 3 attached to a vehicle

A plurality of mount projections, each generally indicated at 24, are integral with and extend laterally from the inner edge 22 of the platform 12 and present a bottom surface 26 and a mounting surface 28 for supporting the platform 12 on a vehicle, as shown in FIGS. 5–8. More specifically, a bracket, generally indicated at 30, is attached to the vehicle structure, generally indicated at 32, by bolts 34 and the bottom surface 26 is held to the angled surface of the bracket 30 by fasteners 38,40. A toe wall 42 extends upwardly to an upper extremity 44 above the upper surface 14 of the platform 12 along the inner edge 22 and the mounting surface 28 extends laterally from the upper extremity 44 of the toe wall 42. As shown in FIGS. 7 and 8, the mounting surface 28 and the bottom surface 26 of the projection 24 extend downwardly and laterally from the upper extremity 44 of the toe wall 42 toward the plane of the upper surface 14 of the platform 12. Mounting surface 28 presents a shoulder 46 to define a recessed portion 48 between the shoulder 46 and the upper extremity 44 of the toe wall 42 for receiving a flange 50 presented by a vehicle structure 32. As alluded to above, the recessed portion 48 includes a hole for receiving fastener 38 for attachment to the flange 50 of the vehicle structure 32 and the mounting surface 28 includes a hole extending to the bottom surface 26 for receiving the fastener 40 for attachment to the vehicle structure 32.

Optionally, the bracket 30 may be integrated with the mount projection 24.

The assembly 10 is characterized by a projection-reinforcing rib 52 integral with and extending from the bottom surface 26 of each of the mount projections 24. Each of the projection-reinforcing ribs 52 extends in a plane transverse to the longitudinal axis of the platform 12, the longitudinal axis extending between the ends 18. A peripheral wall extends about the periphery of each of the mount projections 24 and below the bottom surface 26 thereof and includes a pair of parallel side walls 54 extending transversely to the longitudinal axis. The peripheral wall of each mount projection 24 also includes a short wall 56 having ends closer together than the distance between the side walls 54 and a pair of converging walls 58 joining the side walls 54 at joints 60 and converging from the side walls 54 to the ends of the short wall 56. The projection-reinforcing ribs 52 are disposed centrally between and parallel to the side walls 54 of each of the mount projections 24, although it will be appreciated that each projection 24 could include a plurality of projection-reinforcing ribs 52 with or without one disposed centrally between the side walls 54. A base rib 62 extends between the joints 60 of each pair of the side walls 54 with the associated pair of the converging walls 58 on the bottom surface 26 of each of the mount projections 24. Each of the base ribs 62 is disposed on the bottom surface 26 of each of the mount projections 24 opposite to and parallel to the shoulder 46 defined by the mounting surface 28.

The assembly 10 also includes a plurality of platform-reinforcing ribs 63 integral with and extending from the lower surface 16 for reinforcing the platform 12 and include a plurality of continuing ribs 64 with a pair of the continuing ribs 64 aligned to each of the pair of side walls 54 of each mount projection 24. Each of the continuing ribs 64 extends from the side wall 54 aligned therewith to the outer wall 23. The platform-reinforcing ribs 63 also include a pair of crossing ribs 66 disposed in an X configuration with each crossing rib 66 extending diagonally between each pair of the continuing ribs 64. And each pair of the crossing ribs 66 intersect at an apex 68 and each projection-reinforcing rib 52 extends to and joins the adjacent pair of the crossing ribs 66 at the apex thereof. The platform-reinforcing ribs 63 further include a box rib 70 extending longitudinally between each pair of the continuing ribs 64 at the intersection thereof with the crossing ribs 66 for closing a box-like configuration with the side walls 54 and the outer wall 23 with the crossing ribs 66 extending diagonally between the corners thereof. Central ribs 72 are included in the platform-reinforcing ribs 63 and are disposed between adjacent pairs of the continuing ribs 64. The ends 18 of the platform 12 are arcuate and the outer wall 23 extends through an arcuate section at the ends 18 and the platform-reinforcing ribs 63 include fan ribs 73 extending from the continuing rib 64 adjacent the ends 18 of the platform 12 to the arcuate section.

A tapered wall 74 having a slanted edge extends between the upper extremity 44 of the toe wall 42 and the upper surface 14 of the platform 12 adjacent the outer edge 20 thereof. Each of the tapered walls 74 is disposed to flare or is slanted outwardly toward the adjacent end 18 of the platform 12. An end cap wall 76 extending longitudinally between the upper edge of the arcuate section and the slanted edge of the tapered wall 74 at each of the ends 18 of the platform 12.

In the prior art brackets, the downward applied forces become concentrated at the corner between the vertical portion which is mounted on the vehicle and the horizontal portion on which the running board is mounted. In order to resist these forces, the bracket must be sufficiently strong, which dictated the use of steel.

The mount projections 24 and brackets 30 of the present invention evenly distributes the forces in compression from the stepping platform 12, through the mount projections 24 to the brackets 30 and ultimately to the vehicle 32. The configuration of the assembly 10 avoids point loads.

As will be appreciated the entire assembly 10 is an integral, homogenous or one-piece member molded of organic, polymeric or plastic material, which may or may not be reinforced with a filler, depending upon the material used.

The invention has been described in an illustrative manner, and it is to be understood that the terminology which has been used is intended to be in the nature of words of description, rather than of limitation. Many modifications and variations of the present invention are possible in light of the above teachings and the invention may be practiced otherwise than as specifically described within the scope of the appended claims.

What is claimed is:

1. A running board assembly for attachment to the side of a vehicle and comprising;
    an elongated stepping platform having an upper surface and a lower surface extending between opposite ends along a longitudinal axis and laterally between outer and inner edges,
    a plurality of mount projections molded integral with and extending laterally from said inner edge of said platform and presenting an upper mounting surface for supporting said platform on the vehicle and a bottom surface, wherein said upper mounting surface and said bottom surface are generally parallel with said upper surface of said platform,
    said assembly characterized by a projection-reinforcing rib molded integral with and extending from said bottom surface of each of said mount projections.

2. An assembly as set forth in claim 1 wherein each of said projection-reinforcing ribs extends in a plane transverse to said longitudinal axis.

3. An assembly as set forth in claim 2 including an outer wall extending downwardly below said lower surface of said platform along said outer edge.

4. An assembly as set forth in claim 3 wherein said mount projections include a pair of parallel side walls extending transversely to said longitudinal axis.

5. An assembly as set forth in claim 4 including a plurality of platform-reinforcing ribs molded integral with and extending from said lower surface of said platform for reinforcing said platform, and wherein said platform-reinforcing ribs include a plurality of continuing ribs with a pair of said continuing ribs aligned with said side walls of each mount projection.

6. An assembly as set forth in claim 5 wherein each of said continuing ribs extends from said side wall aligned therewith to said outer wall.

7. An assembly as set forth in claim 6 wherein said platform-reinforcing ribs include a pair of crossing ribs disposed in an X configuration with each crossing rib extending diagonally between each pair of said continuing ribs.

8. An assembly as set forth in claim 7 wherein each pair of said crossing ribs intersect at an apex and each projection-reinforcing rib joins the adjacent pair of said crossing ribs at said apex thereof.

9. An assembly as set forth in claim 8 wherein said projection-reinforcing ribs are disposed centrally between and parallel to said side walls of each of said mount projections.

10. An assembly as set forth in claim 9 wherein each of said mount projections includes a short wall having ends closer together than the distance between said side walls and a pair of converging walls joining said side walls at joint and converging from said side walls to said ends of said short wall.

11. An assembly as set forth in claim 10 including a base rib extending between said joints of each pair of said side walls with the associated pair of said converging walls on the bottom of each of said mount projections.

12. An assembly as set forth in claim 11 wherein said platform-reinforcing ribs include a box rib extending longitudinally between each pair of said continuing ribs at the intersection thereof with said crossing ribs for closing a box-like configuration with said side walls and said outer wall with said crossing ribs extending diagonally between the corners thereof.

13. An assembly as set forth in claim 12 wherein said platform-reinforcing ribs include central ribs disposed between adjacent pairs of said continuing ribs.

14. An assembly as set forth in claim 13 wherein said ends of said platform are arcuate and said outer wall extends through an arcuate section at said ends and said platform-reinforcing ribs include fan ribs extending from said continuing wall next adjacent said ends of said platform to said arcuate section.

15. An assembly as set forth in claim 3 including a toe wall extending upwardly to an upper extremity above said upper surface of said platform along said inner edge, said mounting surface extending laterally from said upper extremity of said toe wall.

16. An assembly as set forth in claim 15 wherein said mounting surface and said bottom of said projection extend downwardly and laterally from said upper extremity of said toe wall toward the plane of said upper surface of said platform.

17. An assembly as set forth in claim 16 wherein said mounting surface presents a shoulder to define a recessed portion between said shoulder and said upper extremity of said toe wall for receiving a flange presented by a vehicle.

18. An assembly as set forth in claim 17 wherein said recessed portion includes a hole for receiving a fastener for attachment to the flange of the vehicle and said mounting surface includes a hole extending to said bottom for receiving a fastener for attachment to the vehicle.

19. An assembly as set forth in claim 17 including a pair of parallel side walls extending transversely to said longitudinal axis, a base rib extending between each pair of said side walls, each of said base walls being disposed on the bottom of each of said mount projections opposite to and parallel to said shoulder defined by said mounting surface.

20. An assembly as set forth in claim 19 including a tapered wall having a slanted edge extending between said upper extremity of said toe wall and said upper surface of said platform adjacent said outer edge thereof.

21. An assembly as set forth in claim 20 wherein said ends of said platform being arcuate and said outer wall extending through an arcuate section having an upper edge above said upper surface of said platform at each of said ends, an end cap wall extending longitudinally between said upper edge of said arcuate section and said slanted edge of said tapered rib at each of said ends of said platform.

22. An assembly as set forth in claim 21 wherein each of said tapered walls is disposed to flare outwardly toward the adjacent of said ends of said platform.

23. An assembly as set forth in claim 22 including a plurality of platform-reinforcing ribs molded integral with and extending from said lower surface of said platform for reinforcing said platform, said platform-reinforcing ribs include at least a pair of continuing ribs aligned with a pair of said side walls of each mount projection, wherein each of said continuing ribs extends from said side wall aligned therewith to said outer wall, and a pair of crossing ribs disposed in an X configuration with each crossing rib extending diagonally between each pair of said continuing ribs, wherein each pair of said crossing ribs intersect at an apex and each projection-reinforcing rib join said crossing ribs at said apex thereof, and wherein said projection-reinforcing ribs are disposed centrally between and parallel to said side walls of each of said mount projections.

* * * * *